(12) United States Patent
Daley

(10) Patent No.: US 8,080,888 B1
(45) Date of Patent: Dec. 20, 2011

(54) HYDRAULIC GENERATOR DRIVE SYSTEM

(75) Inventor: Christian S. Daley, Ames, IA (US)

(73) Assignee: Sauer-Danfoss Inc., Ames, IA (US)

(*) Notice: Subject to any disclaimer, the term of this patent is extended or adjusted under 35 U.S.C. 154(b) by 777 days.

(21) Appl. No.: 12/189,835

(22) Filed: Aug. 12, 2008

(51) Int. Cl.
*F03B 13/00* (2006.01)
*F03B 13/10* (2006.01)
*H02P 9/04* (2006.01)

(52) U.S. Cl. .......... 290/43; 290/44; 290/54; 290/55; 322/4; 60/398

(58) Field of Classification Search .............. 290/43, 290/44, 54, 55; 322/4; 60/398
See application file for complete search history.

(56) References Cited

U.S. PATENT DOCUMENTS

| | | | | |
|---|---|---|---|---|
| 3,427,899 A * | 2/1969 | Gunderson et al. | ............. | 475/82 |
| 3,675,112 A * | 7/1972 | Smith | ............. | 322/4 |
| 4,149,092 A * | 4/1979 | Cros | ............. | 290/54 |
| 4,188,788 A * | 2/1980 | Eller | ............. | 60/398 |
| 4,274,010 A * | 6/1981 | Lawson-Tancred | ............. | 290/55 |
| 4,280,061 A * | 7/1981 | Lawson-Tancred | ............. | 290/55 |
| 4,510,750 A * | 4/1985 | Izumi et al. | ............. | 60/443 |
| 4,568,240 A * | 2/1986 | Ichikawa | ............. | 415/1 |
| 4,667,834 A * | 5/1987 | Lanigan et al. | ............. | 212/288 |
| 4,694,189 A * | 9/1987 | Haraguchi et al. | ............. | 290/40 C |
| 4,904,161 A * | 2/1990 | Kamide et al. | ............. | 417/22 |
| 4,939,954 A * | 7/1990 | Walzer et al. | ............. | 74/733.1 |
| 5,197,860 A * | 3/1993 | Nishida et al. | ............. | 417/34 |
| 5,266,010 A * | 11/1993 | Tanaka et al. | ............. | 417/14 |
| 5,267,441 A * | 12/1993 | Devier et al. | ............. | 60/452 |
| 5,279,122 A * | 1/1994 | Shirai et al. | ............. | 60/452 |
| 5,352,095 A * | 10/1994 | Tanaka et al. | ............. | 417/12 |
| 5,495,128 A * | 2/1996 | Brammeier | ............. | 290/55 |
| 6,883,313 B2 * | 4/2005 | Egelja et al. | ............. | 60/446 |
| 7,183,664 B2 * | 2/2007 | McClintic | ............. | 290/55 |
| 7,418,820 B2 * | 9/2008 | Harvey et al. | ............. | 60/487 |
| 7,436,086 B2 * | 10/2008 | McClintic | ............. | 290/55 |
| 7,485,979 B1 * | 2/2009 | Staalesen | ............. | 290/44 |
| 7,569,943 B2 * | 8/2009 | Kovach et al. | ............. | 290/44 |
| 7,863,767 B2 * | 1/2011 | Chapple et al. | ............. | 290/54 |
| 7,932,620 B2 * | 4/2011 | Plant, Jr. | ............. | 290/55 |
| 7,948,106 B2 * | 5/2011 | Sugano | ............. | 290/54 |
| 8,008,795 B2 * | 8/2011 | Turner et al. | ............. | 290/44 |
| 2005/0155346 A1 * | 7/2005 | Nikolaus | ............. | 60/398 |
| 2006/0210406 A1 * | 9/2006 | Harvey et al. | ............. | 417/334 |
| 2007/0024058 A1 * | 2/2007 | McClintic | ............. | 290/44 |
| 2007/0138798 A1 * | 6/2007 | McClintic | ............. | 290/44 |
| 2008/0191486 A1 * | 8/2008 | Sugano | ............. | 290/54 |
| 2008/0296897 A1 * | 12/2008 | Kovach et al. | ............. | 290/44 |
| 2009/0058095 A1 * | 3/2009 | McClintic | ............. | 290/55 |
| 2009/0140522 A1 * | 6/2009 | Chapple et al. | ............. | 290/43 |
| 2009/0273186 A1 * | 11/2009 | Plant, Jr. | ............. | 290/44 |
| 2009/0273191 A1 * | 11/2009 | Plant, Jr. | ............. | 290/4 C |
| 2010/0056330 A1 * | 3/2010 | Schuh | ............. | 477/52 |
| 2010/0270809 A1 * | 10/2010 | Dahlhaug | ............. | 290/55 |
| 2010/0320770 A1 * | 12/2010 | Dahlhaug | ............. | 290/55 |
| 2010/0320772 A1 * | 12/2010 | Efratyi | ............. | 290/55 |
| 2011/0109094 A1 * | 5/2011 | Kenway et al. | ............. | 290/55 |
| 2011/0142596 A1 * | 6/2011 | Nies | ............. | 415/13 |
| 2011/0142632 A1 * | 6/2011 | Stoltz et al. | ............. | 416/36 |

* cited by examiner

*Primary Examiner* — Pedro J Cuevas

(57) ABSTRACT

A hydraulic generator drive system. The drive system has a control system that utilizes a first loop control that receives a signal associated with hydraulic pump or motor output and sends a command signal to a pump controller in order to control the hydraulic pump. Simultaneously, the control system has a second loop control that receives an input signal from the generator and sends a command signal to an armature to actuate the generator. As a result, a single control system is provided to control the speed and voltage output of the generator.

8 Claims, 7 Drawing Sheets

HYDRAULIC GENERATOR DRIVE SYSTEM

BACKGROUND OF THE INVENTION

This invention relates to a hydraulic generator drive system. More specifically, this invention relates to a robust control system for a hydraulic generator drive.

Hydraulic generator drive systems are used in the operation of heavy machinery such as pavers, agricultural tractors, utility trucks, fire trucks, cranes and similar machines. A hydraulic generator drive system typically is powered by an internal combustion engine that provides a mechanical input to a hydraulic pump. The hydraulic pump is hydraulically connected to a hydraulic motor to provide power to the generator at constant speed. There are a variety of control systems used to operate the conventional hydraulic generator drive system. In general, each is based upon the identical concept of controlling the speed of the generator simultaneously with controlling the voltage of the generator using two different control systems. Each of these systems has its own individual problems including generally high cost and instability in the system due to the separate control systems not working properly in unison.

FIGS. 1-4 represent prior art control systems used to operate hydraulic generator drive systems. FIG. 1 shows a traditional control that incorporates a load sensing control for the output of the pump and a standard automatic voltage regulator control (AVR) for the output of the generator. The load sense control on the pump tries to maintain a constant margin across the "fixed flow control orifice" which maintains a constant flow through this orifice. One of the problems with this control system is that the pump may maintain a constant flow across the orifice; however, there is leakage in the hydraulic motor and as the load increases there is more leakage across the motor. As the load increases the speed of the generator decays even if the flow from the pump remains constant. The problem with this control system is that there are two separate closed loop control systems that can affect each other negatively and causes instability in the whole system.

FIG. 2 shows a second traditional control system that incorporates a flow valve and a standard AVR for the output of the generator. The load sense control of the valve tries to maintain a constant margin across an orifice which maintains a constant flow through this orifice. One of the problems with this control system is that the valve may maintain a constant flow across the flow; however, there is leakage in the hydraulic motor and as the load is increased there is more leakage across the motor. Again, the result is as the load increases the speed of the generator decays even if the flow from the valve remains constant. The problem with this control system is that there are two separate closed loop control systems that can affect each other negatively and causes instability in the whole system.

FIG. 3 shows a third traditional control system. This control system also utilizes a flow control valve and incorporates a closed loop electronic speed control that controls the flow out of the valve. Additionally, the system has a standard AVR for the output of the generator. The problem with this control system is that there are two separate closed loop control systems that can affect each other negatively and causes instability in the system.

FIG. 4 shows a fourth traditional control system that uses an EDC pump control. This control system incorporates a closed loop electronic speed control which controls the flow out of the pump and a standard AVR for the output of the generator. Several problems are presented with this design including that flow control pumps are more expensive than pressure control pumps. Additionally, as with the other circuits, two separate closed loop control systems are presented that affect each other negatively that causes instability within the entire system.

A final prior art control system is shown in FIG. 5 that utilizes a throttle on the internal combustion engine and a fixed displacement pump. In this prior art system a closed loop electronic speed control controls the throttle of the internal combustion engine while a standard AVR is used to control the output of the generator. Again, because two separate closed loop control systems are presented, instability problems occur in the system. Additionally, while this system has been proven to operate satisfactorily when the engine is dedicated to running the generator, oftentimes systems need the engine to run more than just the generator. As a result, the versatility of this system is limited.

Therefore, a principal object of the present invention is to provide a hydraulic generator drive system that utilizes a control system having a single control system.

Another object of the present invention is to improve stability of a hydraulic generator drive system.

These and other objects, features, or advantages of the present invention will become apparent from the specification and claims.

BRIEF SUMMARY OF THE INVENTION

A hydraulic generator drive system having a hydraulic pump hydraulically connected to a hydraulic motor wherein the hydraulic motor receives an input from the pump and generates an output. A generator is mechanically connected and receives the output of the hydraulic motor and has an armature wherein actuation of the armature causes the generator to operate on a load. A control system has a first loop control that receives a signal associated with the hydraulic pump or motor output and sends a second command signal to the pump controller to control the hydraulic pump. The system additionally has a second loop control that receives an input signal from the generator and sends a command signal to the armature. The control of the generator is dependent on both the first and second control loop.

DETAILED DESCRIPTION OF THE PREFERRED EMBODIMENT

Figure 1:
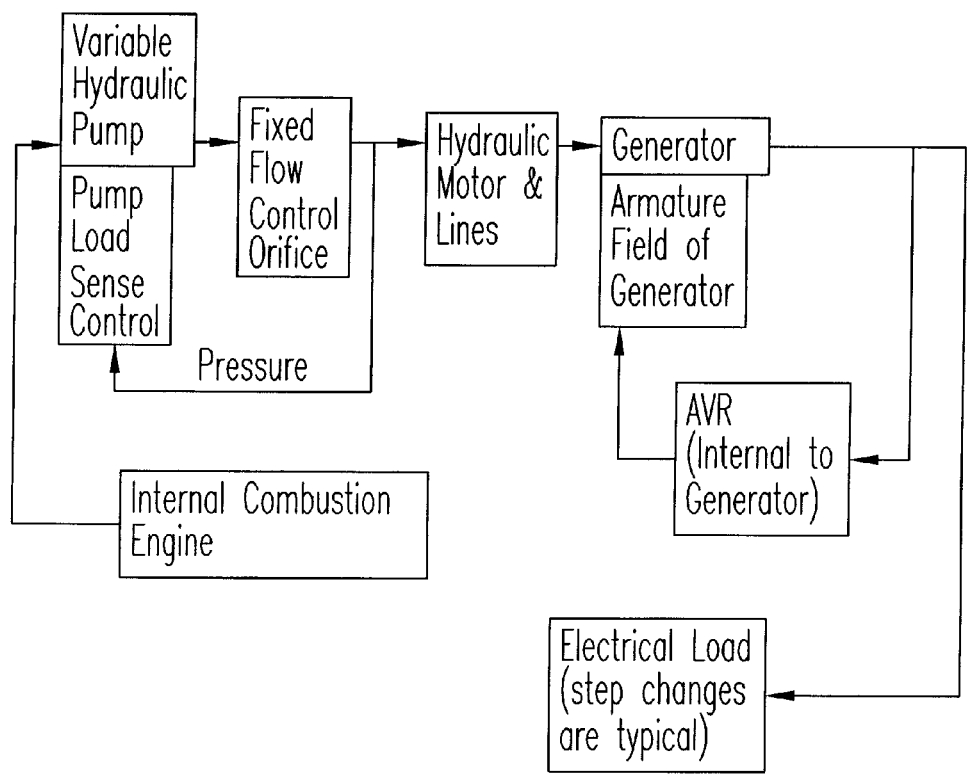
FIG. 1 is a prior art schematic diagram of a hydraulic generator drive system.
Figure 2:
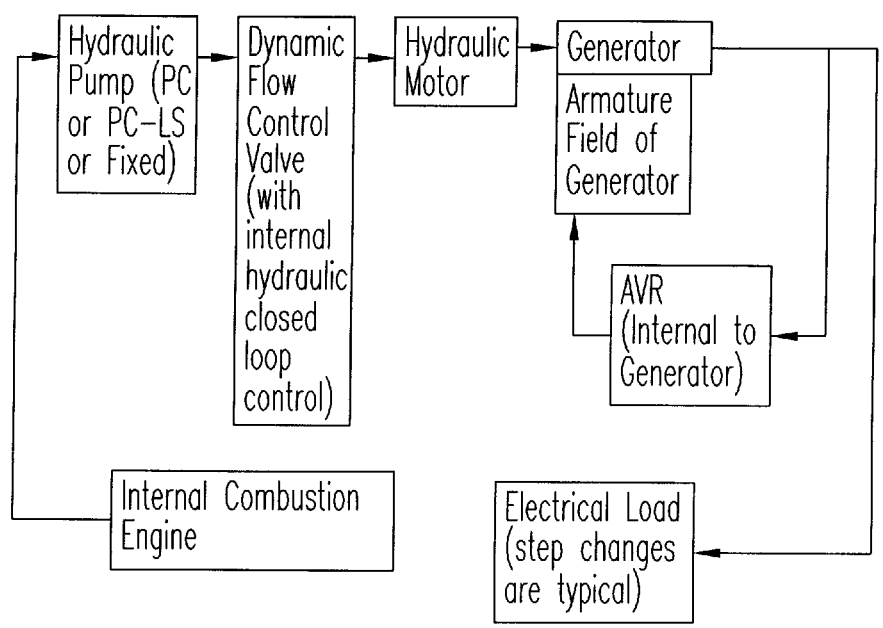
FIG. 2 is a prior art schematic diagram of a hydraulic generator drive system.
Figure 3:
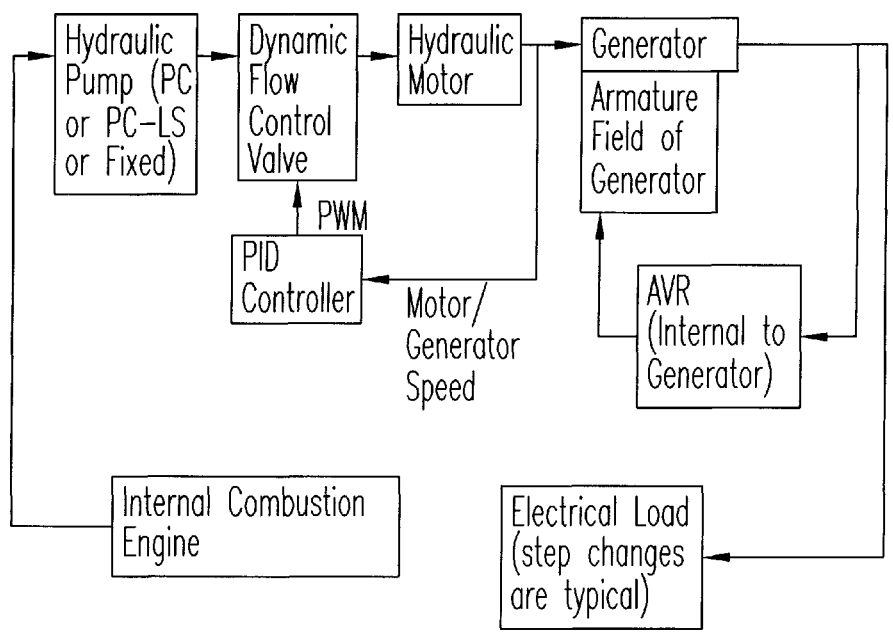
FIG. 3 is a prior art schematic diagram of a hydraulic generator drive system.
Figure 4:
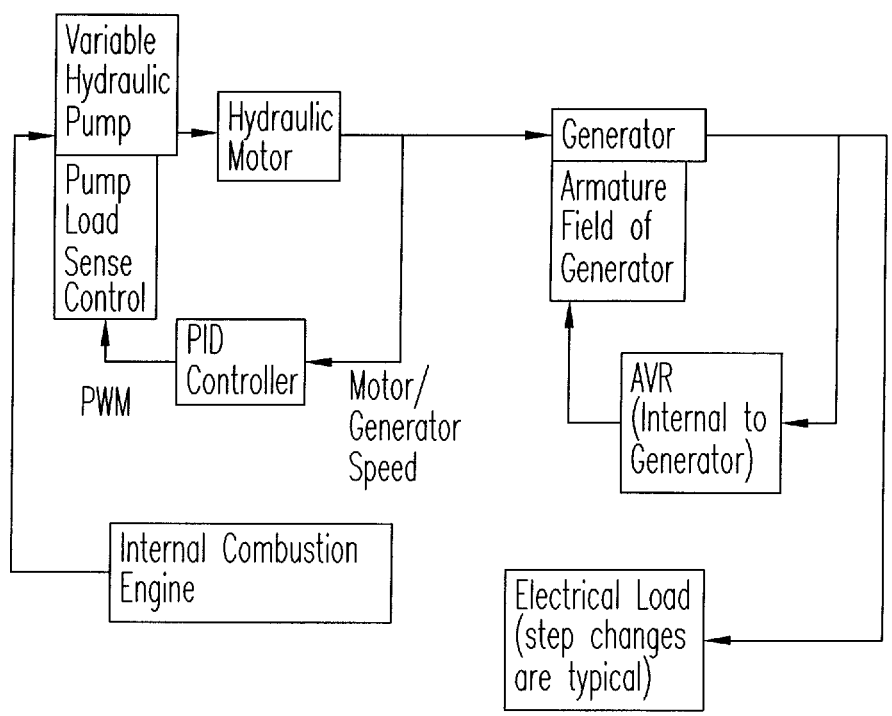
FIG. 4 is a prior art schematic diagram of a hydraulic generator drive system.
Figure 5:
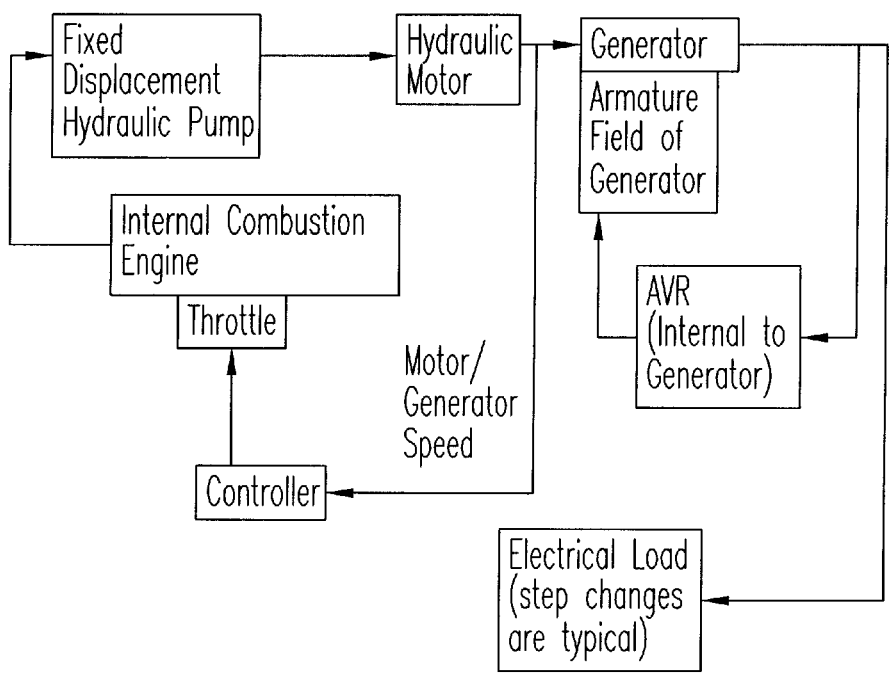
FIG. 5 is a prior art schematic diagram of a hydraulic generator drive system.
Figure 6:
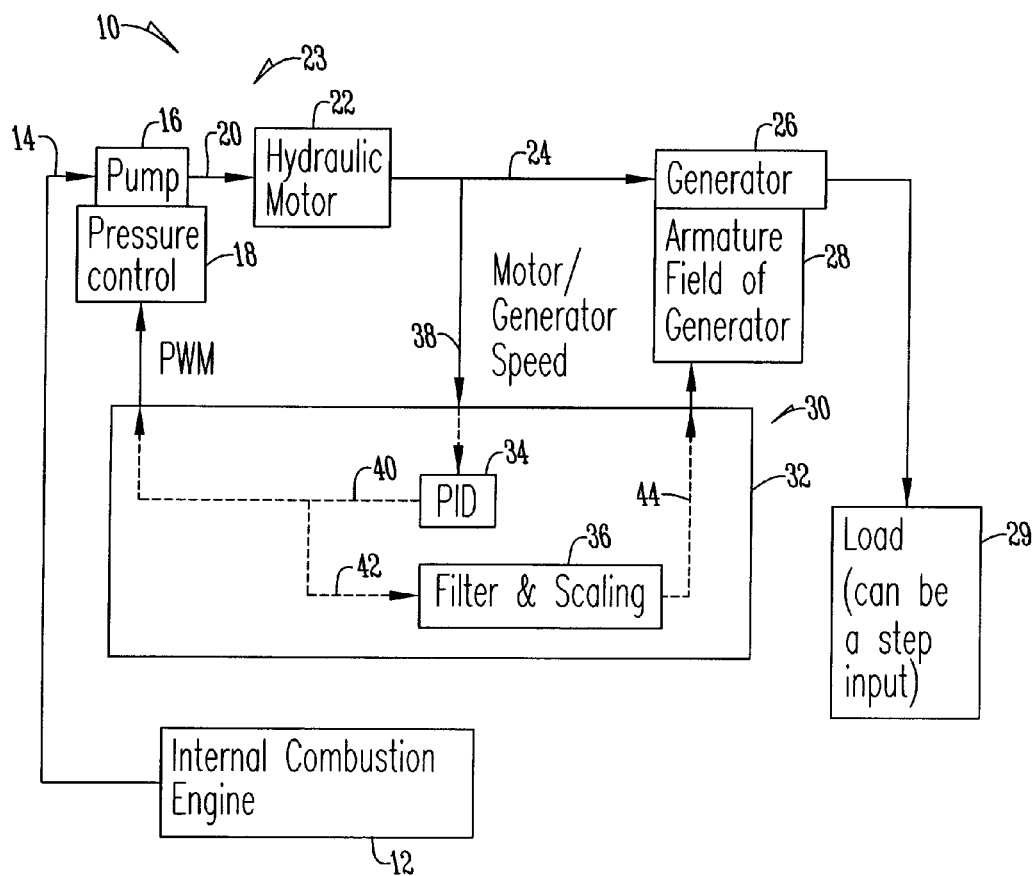
FIG. 6 is a hydraulic generator drive system.
Figure 7:
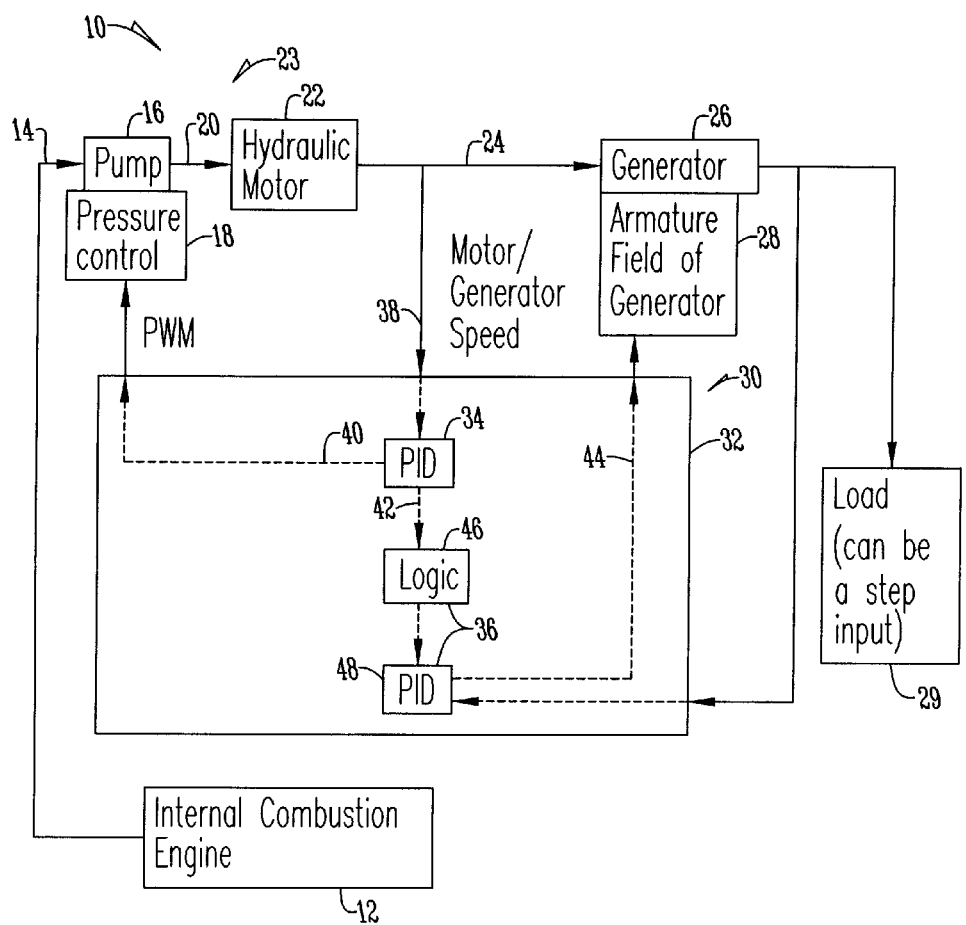
FIG. 7 is a hydraulic generator drive system.

FIGS. 6 and 7 show two embodiments of a hydraulic generator drive system 10. In both systems 10 are connected to internal combustion engine 12 wherein the internal combustion engine provides a mechanical input 14. The mechanical input 14 actuates a hydraulic pump 16 that has a pump controller 18 that in a preferred embodiment is a pressure control. The hydraulic pump 16 is hydraulically connected to and provides an input 20 for a hydraulic motor 22. Together the hydraulic pump 16 and hydraulic motor 22 form a hydraulic transmission 23.

The hydraulic generator drive system 10 has an output 24 that is generated by the hydraulic motor 22 and is received by a generator 26. While considered an output 24 of the hydraulic generator drive system 10, numeral 24 represents an input 24 for the generator 26. Generator 26 has an armature 28 wherein actuation of the armature causes the generator 26 to operate on a load 29. In electric communication with the hydraulic generating drive system 10 is a control system 30 for providing operation to the system 10.

The control system 30 comprises a controller 32 that has a first loop control 34 and a second loop control 36. Specifically, the first loop control 34 receives an input signal 38 from the output 24 of the hydraulic motor 22 and provides a command signal 40 to the pump controller 18 to operate the pump 16. In a preferred embodiment the command signal 40 is a pulse width modulation (PWM) signal. The second loop control 36 receives an input signal 42 from the first loop control 34 and sends a command signal 44 to the armature 28 of the generator 26. In this manner, the controller 32 controls both the output 20 of the hydraulic pump 16 and the output of the generator 26.

In the embodiment seen in FIG. 6 the first loop control 34 is a proportional integral derivative (PID) algorithm while the second loop control 36 has a filter element and a scaling element. In this embodiment the first loop control 34 is a closed loop electronic speed control that controls the output 20 and the second loop control 36 is an open loop voltage regulator that controls the output of the generator 26. The control system 30 of FIG. 6 eliminates negative interaction between the speed and voltage control loops. Thus, instability issues are minimized in the system. Additionally, the need for an AVR is eliminated thus reducing the overall cost of the control system 30 and drive system 10.

In the embodiment shown in FIG. 7 the first loop control 34 again is a PID algorithm. However, in this embodiment the second loop control presents a logic control 46 combined with a second PID. In this embodiment presented is a first loop control 34 that is a closed loop electronic speed control that controls the output 20 of the pump 16 and has a second loop control 36 that is a closed loop voltage regulator that controls the output of the generator 26.

The control system 30 of FIG. 7 again eliminates any negative interaction between controlling the speed of the pump 16 and the voltage of the generator 26 by providing first and second loop controls 34 and 36 that communicate with one another. The system also minimizes cost by eliminating the need for an AVR.

In operation the hydraulic transmission 23 generates an output received by the control system 30. While the output generated in one embodiment is output 24 of the hydraulic motor 22, the output additionally could come from the hydraulic pump 16 without falling outside the scope of this disclosure. From the hydraulic transmission output the control system 30 sends a command signal 40 to the hydraulic transmission 23 to control the hydraulic transmission 23. Simultaneously, an input signal 38 from the input 24 to the generator 26 is received by the control system 30, wherein the control system 30 sends a command signal 44 to the armature 28 of the generator 28 as a result. In one embodiment the output from the hydraulic transmission is also the input to the generator 26.

Thus, provided is a hydraulic generator drive system 10 that presents a control system 30 that combines a controller for controlling speed and controlling voltage together. By combining these two functions into the same control system 30 negative interaction between the two systems is eliminated. Additionally, by eliminating the need for an AVR the control system is more cost effective than previous control systems. With regard to the embodiment of FIG. 6 the control system 30 is able to function properly because the controller 32 can calculate how much load 29 is on the generator 26 by monitoring the amount of current that is sent to the pump controller 18. Additionally, by controlling only pressure to the motor and not flow, eliminates the need for a flow control valve or a fixed flow control orifice thus eliminating power consumption by these components. Thus, the overall efficiency of the system is higher than the prior art versions that focus on flow control. By eliminating a flow control valve or a fixed flow control orifice the controlling of the pressure to the motor simplifies the process of setup, diagnosis and tuning the system when installed. Thus, at the very least all of the stated objectives have been met.

It will be appreciated by those skilled in the art that other various modifications could be made to the device without departing from the spirit and scope of this invention. All such modifications and changes fall within the scope of the claims and are intended to be covered thereby.

What is claimed is:

1. A hydraulic generator drive system comprising:
    a hydraulic transmission having a hydraulic pump hydraulically connected to a hydraulic motor and generating an output;
    an engine providing a mechanical input actuating the hydraulic pump;
    a generator mechanically connected to the hydraulic transmission and having an armature wherein actuation of the armature causes the generator to operate on a load;
    a control system having a first loop control that receives a signal associated with the hydraulic transmission and sends a command signal to the hydraulic transmission to control the hydraulic transmission; and
    said control system having a second loop control that receives an input signal from the first loop control and sends a command signal to the armature to actuate the generator such that the control system controls both the output of the hydraulic pump and the output of the generator.

2. The drive system of claim 1 wherein the first loop control is a closed loop electronic speed control that controls the hydraulic pump.

3. The drive system of claim 2 wherein the second loop control is an open loop voltage regulator that combined with the closed loop electronic speed control actuates the generator.

4. The drive system of claim 3 wherein the open loop voltage regulator has a filter.

5. The drive system of claim 1 wherein the hydraulic pump has a pump controller for controlling operation of the hydraulic transmission.

6. The drive system of claim 5 wherein the control system calculates the load the generator is operating on by monitoring the current sent to the pump controller.

7. The drive system of claim 5 wherein the pump controller is a pressure control.

8. The drive system of claim 1 wherein the output of the hydraulic transmission is the input of the generator.

* * * * *